I. C. PRATT.
Wheel-Plow.
No. 46,974.
Patented Mar. 21, 1865.
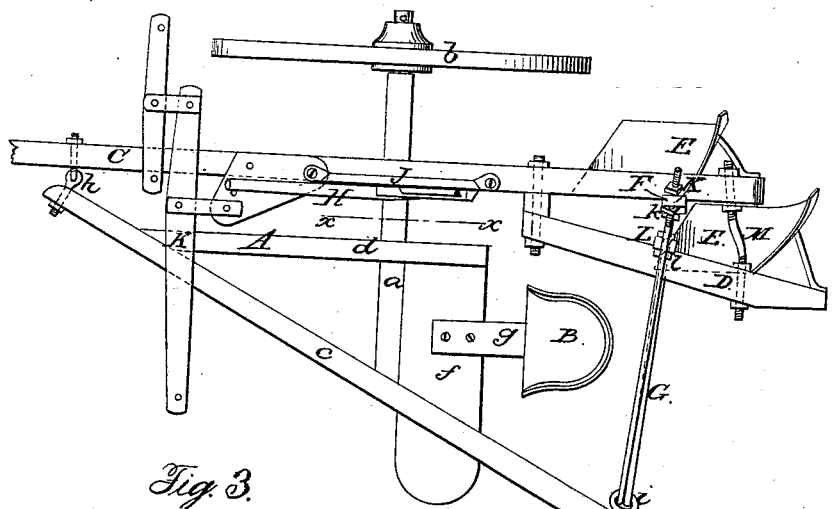
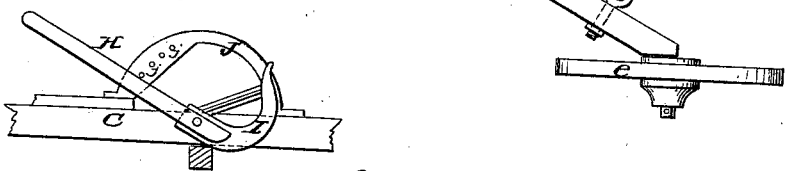
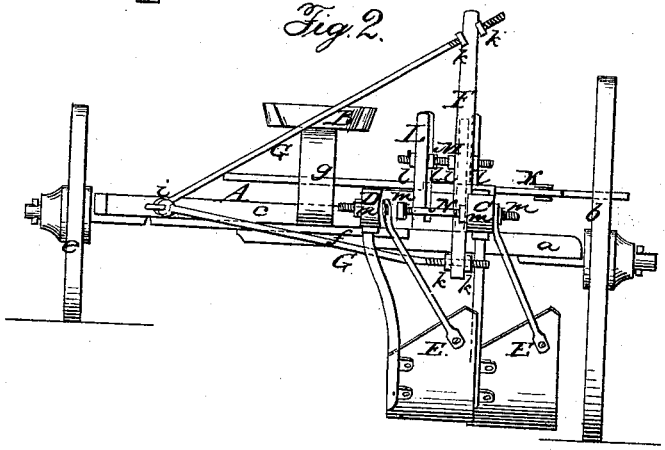
Witnesses:
Inventor:

UNITED STATES PATENT OFFICE.

IRA C. PRATT, OF MORTON, ILLINOIS, ASSIGNOR TO J. M. CAMPBELL, D. MOOBERRY, E. EMERSON, AND H. REEVES, OF SAME PLACE.

IMPROVEMENT IN SULKY GANG-PLOWS.

Specification forming part of Letters Patent No. 46,974, dated March 21, 1865.

*To all whom it may concern:*

Be it known that I, IRA C. PRATT, of Morton, in the county of Tazewell and State of Illinois, have invented a new and Improved Sulky Gang-Plow; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a rear view of the same; Fig. 3, a vertical section of a portion of the same, taken in the line $x\,x$, Fig. 1.

Similar letters of reference indicate like parts.

This invention relates to a new and useful improvement in the construction and arrangement of certain parts pertaining to a sulky gang-plow, which will be hereinafter fully shown and described and the advantages set forth.

A represents what may be termed the "main frame" of the device, composed of an axle, $a$, having a wheel, $b$, on one end of it, a bar, $c$, attached obliquely to the end of the axle opposite to that on which the wheel $b$ is fitted, and a short bar, $d$, attached to the axle at right angles, and having its front end framed into the front part of the bar $c$. The rear end of the bar $c$ has a wheel, $e$, attached to it, smaller in diameter than the wheel $b$, and a plank, $f$, is attached to the rear of bar $d$ and the bar $c$, said plank having an inclined standard, $g$, secured to it, with the driver's seat B on its upper end. The wheel $b$ is larger in diameter than $e$, in order that the former may run in the furrow and admit of the main frame being in a horizontal position.

C is the draft-pole, which is attached to the front end of the oblique bar $c$ by means of a joint, $h$. This draft-pole extends some distance back of the axle $a$, and has a short oblique bar, D, attached to it, which projects a short distance beyond the rear end of the draft-pole.

E E are plows, one of which is attached to the rear end of the draft-pole and the other to the bar D, the plow of the draft-pole being a short distance in advance of the plow of bar D. The rear part of the draft-pole has an upright, F, attached to it, from the upper and lower ends of which brace-rods G extend to the oblique bar $c$, and are attached to by joints $i$.

H is a lever, which is attached to the draft-pole C, and has a cam, I, attached to its lower end, said cam being directly over the axle $a$. The draft-pole has a curved bar, J, attached to it, which bar is perforated with holes $j$ to receive a pin to keep the lever H and cam I in the desired position. The rods G pass through the upright F, and have screws cut on them to receive jam-nuts $k\,k$, by turning which the draft-pole C may be adjusted laterally and more or less laud given the plows E E, as may be desired.

K is a double-tree attached to the draft-pole C. This double-tree is so arranged that two horses may be attached to it at the near side and one to the off side.

The bar D has a short upright, L, attached to it, through which and the upright F a screw-rod, M, passes, having jam-nuts $l$ upon it, and a similar screw-rod, N, passes through the rear of the draft-pole C and bar D, and has jam-nuts $m$ upon it. By turning these jam-nuts the plows may be set at a greater or less distance apart, as may be desired.

By adjusting the lever H the plows E E may be thrown entirely out of the ground, or made to penetrate into it at any required depth, according to the depth of furrow required.

By having the parts arranged as described, with a wheel, $e$, at the rear of bar $c$, opposite the plows E E, the latter do not require a bar or landside, as they will be prevented from bearing against the land, the wheel $e$ keeping them off. Consequently much friction is avoided.

I claim as new and desire to secure by Letters Patent—

1. Attaching one or more plows, E, direct to the draft-pole C when the latter is connected to the main frame A, and all arranged to operate as and for the purpose set forth.

2. The oblique bar D, attached to the rear part of the draft-pole C, and having a plow, E, secured to it, and arranged, as shown, so as to be capable of being adjusted substantially as and for the purpose specified.

3. The lever H, with cam I attached, arranged and applied to the draft-pole to operate in relation with the axle $a$ of frame A as and for the purpose specified.

IRA C. PRATT.

Witnesses:
THOS. WEBB, Sr.,
THOMAS WEBB, Jr.